US009865165B2

(12) United States Patent
Moritani et al.

(10) Patent No.: US 9,865,165 B2
(45) Date of Patent: Jan. 9, 2018

(54) TRAFFIC SIGN RECOGNITION SYSTEM

(71) Applicant: Mazda Motor Corporation, Aki-gun, Hiroshima (JP)

(72) Inventors: Takayuki Moritani, Hiroshima (JP); Yasutaka Otsubo, Aki-gun (JP); Tsuyoshi Arinaga, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/354,100

(22) Filed: Nov. 17, 2016

(65) Prior Publication Data

US 2017/0154528 A1 Jun. 1, 2017

(30) Foreign Application Priority Data

Nov. 26, 2015 (JP) ................................ 2015-230223

(51) Int. Cl.
*B60W 50/14* (2012.01)
*G01C 21/26* (2006.01)
*G08G 1/0967* (2006.01)
*G06K 9/00* (2006.01)

(52) U.S. Cl.
CPC ... *G08G 1/096783* (2013.01); *G06K 9/00818* (2013.01)

(58) Field of Classification Search
CPC ........................... G06K 9/00818; B60W 30/12
See application file for complete search history.

(56) References Cited

U.S. PATENT DOCUMENTS

| 2012/0154591 A1* | 6/2012 | Baur ................... B60R 1/00 348/148 |
| 2014/0200759 A1* | 7/2014 | Lu ..................... B60D 1/245 701/28 |
| 2016/0180182 A1* | 6/2016 | Gupta ............... G06K 9/00805 348/148 |

FOREIGN PATENT DOCUMENTS

| JP | 2012-276924 | * | 6/2014 | ............... G08G 1/16 |
| JP | 2014120111 A | | 6/2014 | |

* cited by examiner

*Primary Examiner* — Joseph Feild
*Assistant Examiner* — Pameshanand Mahase
(74) *Attorney, Agent, or Firm* — Alleman Hall Creasman & Tuttle LLP

(57) ABSTRACT

A traffic sign recognition system includes a display for displaying caution information of a traffic light, and a processor configured to execute a traffic light detecting module for detecting a traffic light, a bypass lane detecting module for detecting a bypass lane, a line of sight detecting module for detecting a line of sight of a driver, and a vehicle behavior determining module for detecting a traveling direction of a vehicle. The processor controls the display to display caution information when the line of sight is different from a direction of the traffic light, and controlling the display to refrain from displaying the caution information when the detected line of sight matches the direction of the traffic light. The display is refrained from displaying the caution information when the bypass lane is detected and the traveling direction is toward the bypass lane, regardless of the line of sight.

4 Claims, 3 Drawing Sheets

TRAFFIC SIGN RECOGNITION SYSTEM

BACKGROUND

The present invention relates to a traffic sign recognition system.

In view of preventing danger etc., it is extremely undesirable to be unaware of a traffic sign, such as a traffic light or a road sign installed on a road. JP2014-120111A discloses an art in which a detector for detecting a line of sight of a driver driving a vehicle is provided and if a traffic light and/or a traffic sign ahead of the vehicle is not viewed by the driver, caution information is displayed.

Incidentally, there is a case where a bypass lane for bypassing an intersection at which a traffic light is installed is provided on a road. For example, when a traffic light is installed at a four-way junction at which a certain road intersects with another road, the certain road may have a bypass lane branching slightly before the intersection and for bypassing the intersection with the traffic light so that vehicles can travel to the other road (e.g., left turn bypass lane).

When such a bypass lane is provided, displaying the caution information simply due to the unawareness of the driver of the traffic light etc. as described in JP2014-120111A becomes unnecessary and becomes a cause of annoyance to the driver.

SUMMARY

The present invention is made in view of the above issues and aims to provide a traffic sign recognition system, which is capable of displaying caution information when a driver is unaware of a traffic light, while preventing displaying the caution information unnecessarily.

According to one aspect of the present invention, a traffic sign recognition system is provided. The system includes a display unit for displaying, for a driver of the vehicle, caution information regarding the traffic light, and a processor configured to execute a traffic light detecting module, a bypass lane detecting module for detecting a bypass lane bypassing a road intersection where the detected traffic light is installed, at a position slightly before the vehicle reaches the traffic light, and a line of sight detecting module for detecting a line of sight of the driver, and a vehicle behavior determining module for detecting a traveling direction of the vehicle. The processor is configured to control the display unit to display the caution information regarding the traffic light when the detected line of sight of the driver is different from a direction of the traffic light, and controlling the display unit to refrain from displaying the caution information when the detected line of sight of the driver matches with the direction of the traffic light. The processor controls the display unit to refrain from displaying the caution information when the bypass lane is detected at the position slightly before the vehicle reaches the traffic light and the detected traveling direction is toward the bypass lane, regardless of the line of sight of the driver.

According to the above configuration, when the line of sight of the driver is not oriented toward the traffic light, the traffic light is considered as not viewed by the driver and the caution information regarding the traffic light is displayed, which is preferable in view of safe driving. Further, when the line of sight of the driver is oriented toward the traffic light, the traffic light is considered as viewed by the driver, and the caution information is not displayed, and thus, it can be prevented that the caution information is displayed unnecessarily. Additionally, when the vehicle travels to the bypass lane, the traffic light becomes irrelevant. Thus, the caution information is not displayed regardless of the line of sight of the driver so as to more reliably prevent the caution information from being displayed unnecessarily.

The processor may control the display unit to display the caution information when the line of sight of the driver is different from the direction of the traffic light and the vehicle has passed an entrance of the bypass lane. If the vehicle has passed the entrance of the bypass lane, then the vehicle will not travel to the bypass lane. In such a state, it is preferable in safe traveling to display the caution information when the traffic light is not viewed by the driver.

The vehicle behavior determining module may detect whether the vehicle travels toward the bypass lane based on an operation state of a direction indicator of the vehicle. Since a direction indicator control for traveling toward the bypass lane is performed slightly before the entrance of the bypass lane, confirmation of a state that the driver can ignore the traffic light, i.e., confirmation that the caution information is not necessary, can be performed at an early stage.

The bypass lane may be for one of left turn and right turn. Since a large number of left turn bypass lanes and right turn bypass lanes exist, an opportunity to prevent displaying the caution information unnecessarily can be increased.

DETAILED DESCRIPTION OF EMBODIMENT

Figure 1:
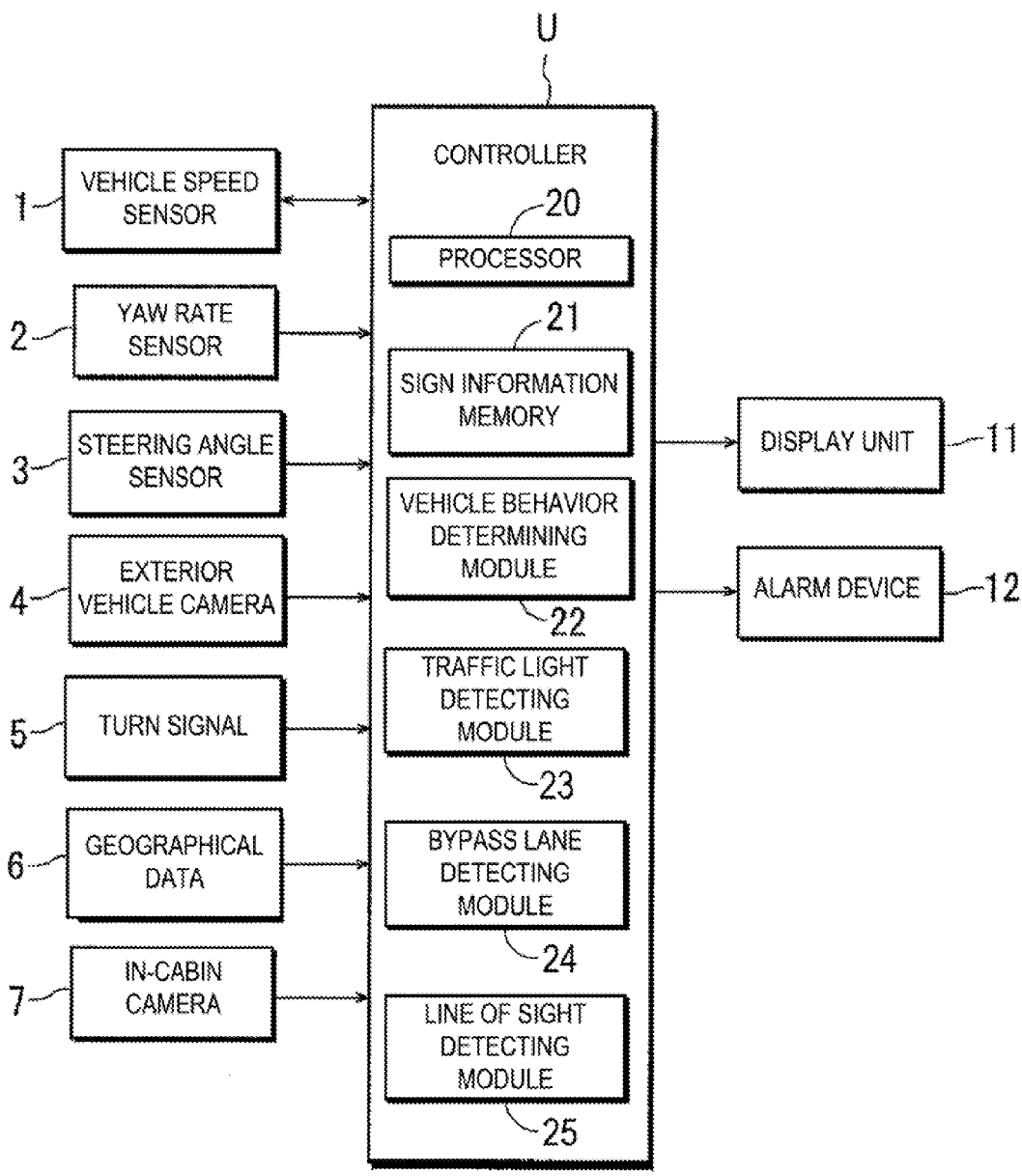
FIG. 1 is a block diagram illustrating an example of a control system according to the present invention.

In FIG. 1, the reference character "U" is a controller (control unit) configured by using a microcomputer, including a processor 20. The controller U receives signals from various sensors or devices 1 to 7. Specifically, the reference character "1" is a vehicle speed sensor for detecting a vehicle speed. The reference character "2" is a yaw rate sensor for detecting a yaw rate which applies to a vehicle concerned (hereinafter, simply referred to as "the vehicle"). The reference character "3" is a steering angle sensor for detecting a steering angle (including a steering direction). The reference character "4" is an exterior vehicle camera for imaging a view ahead of the vehicle, and it detects a traffic light ahead of the vehicle. In this embodiment, the camera 4 acquires a black and white image to simply detect existence and direction of a traffic light; however, if it is to determine a color of the traffic light (whether it being red, yellow or green), a camera acquirable of a color image may be adopted. The reference character "5" is a turn signal indicator (direction indicator) for detecting an intention of a driver of the vehicle for turning either right or left. The reference character "6" is a geographical data acquiring system (navigation system) for procuring information regarding the existence of a traffic light and a road condition ahead of the vehicle (particularly existence of a bypass lane). The reference character "7" is an in-cabin camera for detecting a line of sight of the driver of the vehicle, particularly in order to detect whether the traffic light is viewed.

The controller U controls a display unit 11 and an alarm device 12 via the processor 20 of the controller U. When it is determined that the traffic light is not viewed by the driver, the display unit 11 displays caution information regarding this traffic light. This display unit 11 may be configured by a display provided in front of a steering wheel or a head-up display. Further the alarm device 12 may be a display type using a display separately provided from the display unit 11, voice guidance or a buzzer which issues an alarm sound, or a device using both of the alarm on display and the alarm by sound. Note that although the alarm device 12 may be omitted, in a case where it is determined that the traffic light is not viewed by the driver and the vehicle reaches the close proximity of an intersection at which the traffic light is installed, the alarm device 12 may issue the alarm.

The controller U includes a sign information memory 21 for storing image data of at least a traffic light and meanings thereof in association with each other (creating a database). Further, the controller U includes a vehicle behavior determining module 22 for determining, particularly, a traveling direction of the vehicle. Note that the traveling direction of the vehicle is determined, for example, based on one or a combination of any of an operation state of the turn signal indicator 5, the steering angle detected by the steering angle sensor 3, and the yaw rate detected by the yaw rate sensor 2. Further in this embodiment, a control according to the present invention is executed regardless of the magnitude of the vehicle speed; however, when the vehicle speed detected by the vehicle speed sensor 1 is zero (0) or substantially zero, it is considered that danger will not occur and the control may be not performed.

Figure 2:
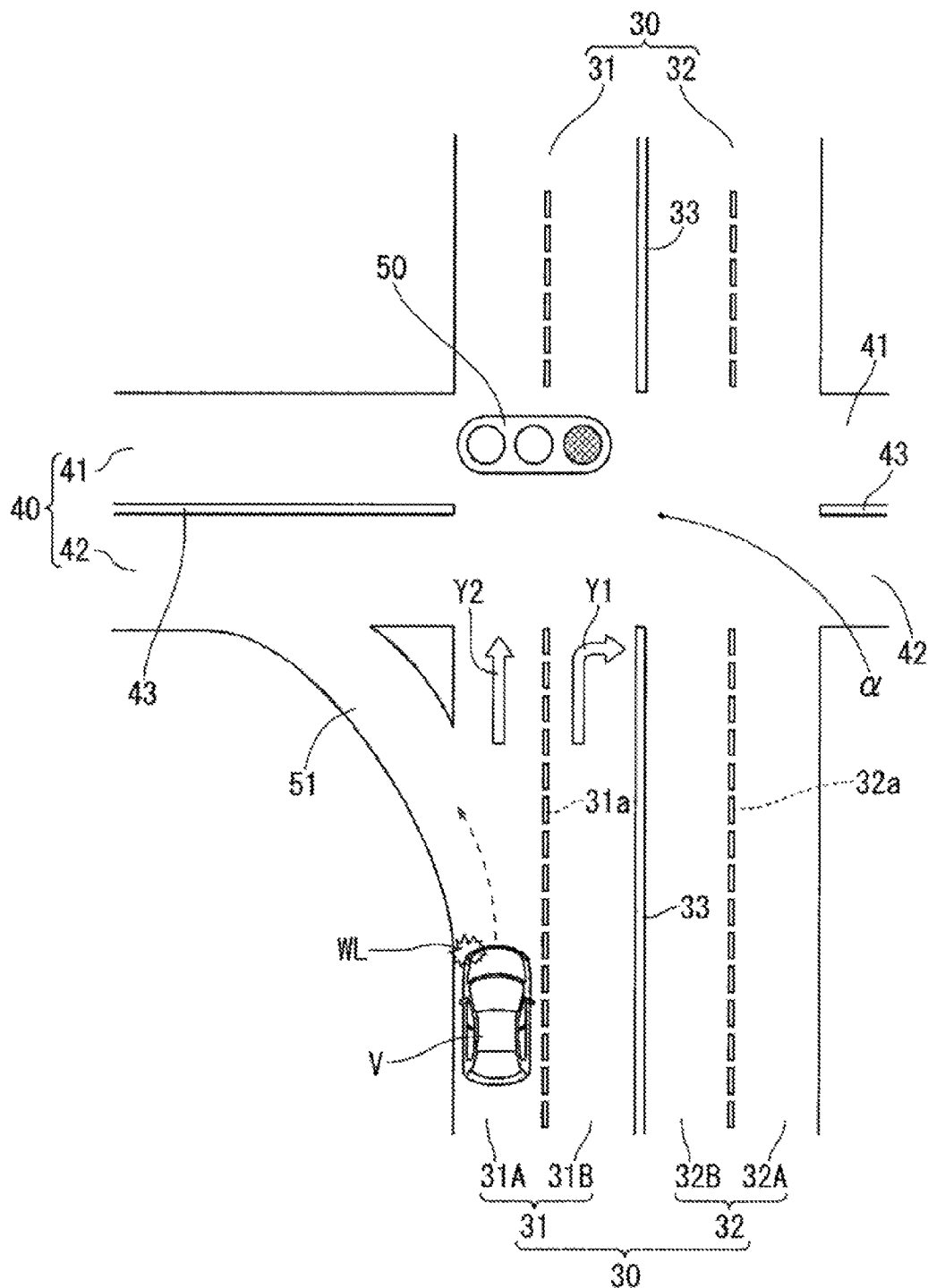
FIG. 2 is a view illustrating an example of a road structure having a left turn bypass lane.

FIG. 2 is a view illustrating an example of a road structure having a bypass lane. In the example of FIG. 2, a road 30 extending straight ahead of a vehicle V intersects with a road 40 extending perpendicularly to the road 30, thus an intersection α which is a four-way junction is formed. The intersection α is installed with a traffic light 50 for the road 30.

In this embodiment, the road 30 has two lanes for traffic in each direction, the two lanes 31 for one of the directions are denoted with reference characters 31A and 31B, and the boundary thereof is denoted with a reference character 31a. The two lanes 32 for the opposite direction are denoted with reference characters 32A and 32B, and the boundary thereof is denoted with a reference character 32a. Further, a central boundary between the lanes 31 and the lanes 32 is denoted with a reference character 33. Note that, on the road 30, an arrow Y1 indicating a right turn lane is drawn on a road surface of the lane 31B, and an arrow Y2 indicating a straight ahead lane is displayed on a road surface of the lane 31A.

In this embodiment, the road 40 has one lane for traffic in each direction, the lane for one of the directions is denoted with a reference character 41 and the lane for the opposite direction is denoted with a reference character 42, and a central boundary between the lanes 41 and 42 is denoted with a reference character 43.

In this embodiment, a case of left-hand traffic is described, in which the vehicle V is on the lane 31A and slightly before the intersection α. If the vehicle V is on the lane 31A to make a left turn at the intersection α toward the lane 42 of the road 40, the vehicle V follows a signal of the traffic light 50. If the traffic light 50 is the red signal light, the vehicle stops slightly before the intersection α and waits until the traffic light 50 turns to the green signal light.

The road 30 has a bypass lane 51 slightly before the intersection α and ahead of the vehicle V. The bypass lane 51 connects the lane 31A of the road 30 and the lane 42 of the road 40 to bypass the intersection α. The bypass lane 51 is a left turn lane and permits traveling from the lane 31A to the lane 42 freely in disregard of the traffic instruction by the signal color of the traffic light 50.

In the example of FIG. 2, the vehicle V is at slightly before the bypass lane 51 and intends to travel toward the bypass lane 51, and for this, the left turn signal (lamp) is turned on (the left turn signal is denoted with a reference character WL). When the vehicle V intends to travel to the bypass lane 51, even if the line of sight of the driver is not oriented toward the traffic light 50, the caution information regarding the traffic light 50 is not displayed.

Figure 3:
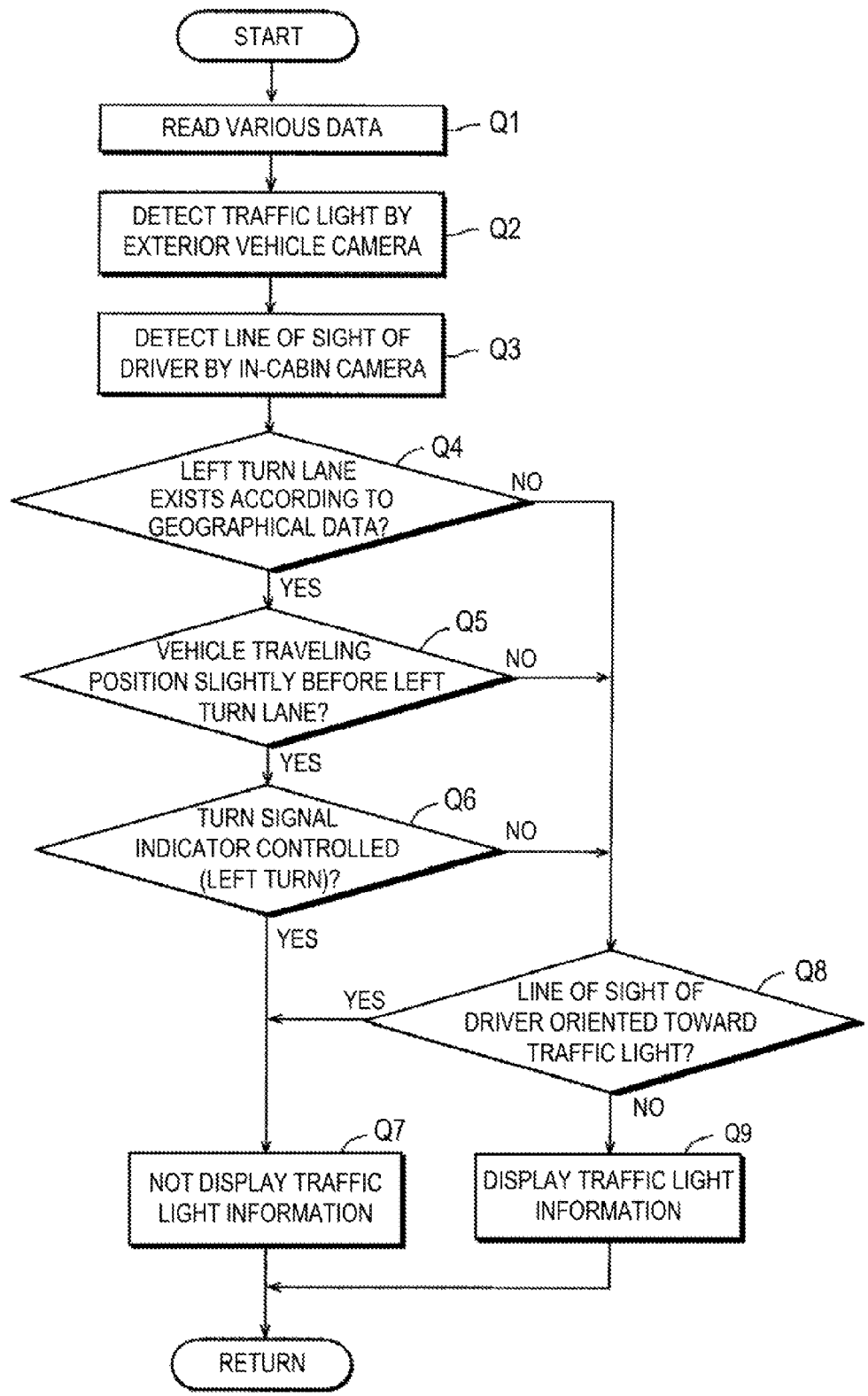
FIG. 3 is a flowchart illustrating an example of a control according to the present invention.

Next, an example of the control by the controller U is described with reference to the flowchart of FIG. 3. Note that in the following description, "Q" indicates each process, and the control example is given considering a case where the vehicle V and the road structure are as illustrated in FIG. 2.

First in Q1, the signals from the various sensors or the devices 1 to 7 are received. In Q2, traffic sign information regarding the traffic light stored in the sign information memory 21 of the controller U is detected from view(s) imaged by the exterior vehicle camera 4 (in the case of FIG. 2, the existence and direction of the traffic light 50). Then in Q3, the in-cabin camera 7 detects the line of sight of the driver.

In Q4, whether the bypass lane 51 is provided in the surrounding of the vehicle V is determined based on geographical data acquired by the geographical data acquiring system 6. If the determination result of Q4 is positive, in Q5, whether the vehicle V is slightly before the bypass lane 51 (branching section thereof) is determined. If the determination result of Q5 is positive, in Q6, whether the turn signal indicator is controlled to indicate a direction toward the bypass lane 51 (in the case of FIG. 2, turn signal indicator control for left turn) is determined. If the determination result of Q6 is positive, in Q7, the caution information regarding the traffic light 50 is not displayed (removed).

If one of the determination results of Q4, Q5 and Q6 is negative, the control proceeds to Q8 where whether the line of sight of the driver is oriented toward (matches with the direction of) the detected traffic light 50 is determined. If the determination result of Q8 is negative, it is considered that the traffic light 50 is not viewed by the driver of the vehicle V, and in Q9, the caution information regarding the traffic light 50 is displayed on the display device 11 so as to bring to attention of the driver. Note that the display contents of the caution information may suitably be, for example, "Attention to traffic light ahead" or "Attention, traffic light," and, if the signal color of the traffic light is also determinable, "Red Light, stop immediately." Further, when the traffic light 50 is the red signal light and the vehicle travels above a given speed toward the intersection α, the alarm device 12 may issue an alarm (preferably an alarm by sound) "Red Light, stop immediately" etc. Note that the caution information displayed corresponding to the traffic light 50 may be stored in the sign information memory 21 for every traffic light (especially together with the operating state thereof).

The transition from Q4 to Q8 corresponds to processing when the bypass lane 51 does not exist. The transition from Q5 to Q8 corresponds to processing when the vehicle V cannot travel toward the bypass lane 51 even though the bypass lane 51 exists because the vehicle V already passed the bypass lane 51 (branching section, which is the entrance thereof), i.e., the vehicle V did not enter the branching section. The transition from Q6 to Q8 corresponds to processing when an intention to travel toward the bypass lane 51 cannot be detected even though the bypass lane 51 exists.

Here the intention of the vehicle V to travel toward the bypass lane 51 (i.e., traveling direction) may be detected based on, in addition to the turn signal indicator control state, one or a combination of two or more of the steering angle, the yaw rate, a trace of positional shift of the vehicle V based on a global positioning system (GPS), etc. Note that since the turn signal indicator control is performed before changing a heading course, in view of determining the intention to travel toward bypass lane 51 as early as possible, it is preferable to determine whether the vehicle V travels toward the bypass lane 51 based on the turn signal indicator control state slightly before reaching the bypass lane 51.

Although the embodiment is described above, the present invention is not limited to this, and may suitably be modified within the scope of the claims. Examples of the bypass lane 51 suitably include any lanes which bypass the traffic light 50 (intersection α), such as a right turn lane and a straight ahead lane. Each one or a combination of two or more of the group of processes of the flowchart indicates a function of the controller U, and by adding "module" to the name/phrase indicating the function, it is possible to consider them as software components of the controller. For example, the controller U may comprise the vehicle behavior determining module 22 executable by the processor 20 of the controller U to detect the traveling direction of the vehicle via at least one of the steering angle sensor 3, the turn signal 5, and the yaw rate sensor 2; a specific traffic light detecting module 23 executable by the processor 20 to detect the specific traffic light ahead of the vehicle via the exterior vehicle camera 4; a bypass lane detecting module 24 executable by the processor 20 to detect a bypass lane bypassing a road intersection where the detected traffic light is installed, at a position slightly before the vehicle reaches the traffic light via the turn signal indicator 5; a line of sight detecting module 25 executable by the processor 20 to detect a line of sight of the driver of the vehicle in order to detect whether the traffic light is viewed via the in-cabin camera 7. Even if the driver is unaware of the traffic light, when there is no problem for the vehicle V to continue travelling (e.g., the traffic light is the green signal light), the caution information may not be displayed (the caution information may be displayed only when it is dangerous or requires extremely high attention if the travel continues). The purpose of the present invention is not limited to the explicitly described purpose, and also implicitly includes providing what is expressed as practically preferable or advantageous.

According to the present invention, it is possible to display caution information when a driver is unaware of a traffic light, while preventing displaying the caution information unnecessarily.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

V Vehicle
α Intersection
U Controller
4 Exterior Vehicle Camera (For Traffic Sign Detection)
5 Turn Signal Indicator (For Traveling Direction Detection)
7 In-cabin Camera (For Driver's Line of Sight Detection)
11 Display Unit
21 Sign Information Memory
22 Vehicle Behavior Determining Module
31A Lane (Drive Lane of Vehicle V, Connecting to Bypass Lane)
42 Lane (Connecting to Bypass Lane)
50 Traffic Light
51 Bypass Lane (For Bypassing Intersection α)

What is claimed is:

1. A traffic sign recognition system, comprising:
a traffic light detecting module for detecting a traffic light ahead of a vehicle;
a display unit for displaying, for a driver of the vehicle, caution information regarding the traffic light; and
a processor configured to execute:
a bypass lane detecting module for detecting a bypass lane bypassing a road intersection where the detected traffic light is installed, at a position slightly before the vehicle reaches the traffic light;
a line of sight detecting module for detecting a line of sight of the driver;
a vehicle behavior determining module for detecting a traveling direction of the vehicle; wherein
the processor is configured to control the display unit to display the caution information regarding the traffic light when the detected line of sight of the driver is different from a direction of the traffic light, and controlling the display unit to refrain from displaying the caution information when the detected line of sight of the driver matches with the direction of the traffic light,
wherein the processor controls the display unit to refrain from displaying the caution information when the bypass lane is detected at the position slightly before the vehicle reaches the traffic light and the detected traveling direction is toward the bypass lane, regardless of the line of sight of the driver.

2. The system of claim 1, wherein the processor controls the display unit to display the caution information when the line of sight of the driver is different from the direction of the traffic light and the vehicle has passed an entrance of the bypass lane.

3. The system of claim 1, wherein the vehicle behavior determining module detects whether the vehicle travels toward the bypass lane based on an operation state of a direction indicator of the vehicle.

4. The system of claim 1, wherein the bypass lane is for one of left turn and right turn.

* * * * *